United States Patent [19]

Prosen

[11] Patent Number: 5,035,558
[45] Date of Patent: Jul. 30, 1991

[54] CARGO TIE-DOWN DEVICE

[76] Inventor: Gildo G. Prosen, 7071 Belden St., San Diego, Calif. 92111

[21] Appl. No.: 628,363

[22] Filed: Dec. 17, 1990

Related U.S. Application Data

[63] Continuation-in-part of Ser. No. 512,353, Apr. 30, 1990, abandoned.

[51] Int. Cl.⁵ ............................................. F16G 11/00
[52] U.S. Cl. ........................................ 410/96; 24/130; 24/343
[58] Field of Search ........................... 24/300–302, 24/343, 346, 298, 369, 466, 265 R, 265 H, 265 CD, 120 R, 129 B, 115 H, 30.5 R, 30.5 S, 132 R, 130; 410/96, 99–102; 294/150, 152

[56] References Cited

U.S. PATENT DOCUMENTS

| | | | |
|---|---|---|---|
| 2,592,696 | 4/1952 | Hoody | 24/129 R |
| 4,340,998 | 7/1982 | Liberge | 24/130 |
| 4,432,121 | 2/1984 | Dupre | 24/300 |
| 4,505,011 | 3/1985 | Dupuy | 24/132 R |
| 4,622,724 | 11/1986 | Dupre | 24/115 H |
| 4,785,509 | 11/1988 | Fisher | 24/129 R |
| 4,831,692 | 5/1989 | Chuan | 24/300 |

Primary Examiner—Frank E. Werner
Assistant Examiner—Brian K. Dinicola
Attorney, Agent, or Firm—Henri J. A. Charmasson

[57] ABSTRACT

A cargo hold-down system including hooks for attaching lines of rope or fabric-jacketed elastomeric cord of varying diameters to a variety of polygonal and cylindrical surfaces of a vehicle-mounted luggage rack. The system incorporates four parts, the line, two axial length adjusting end hooks, and an open-eyed hook perpendicularly attachable at any point along the line.

7 Claims, 2 Drawing Sheets

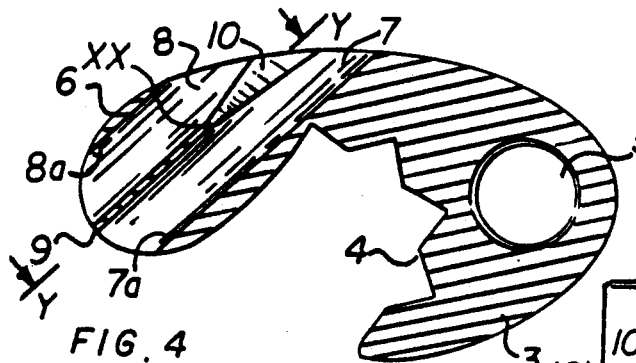
FIG. 4
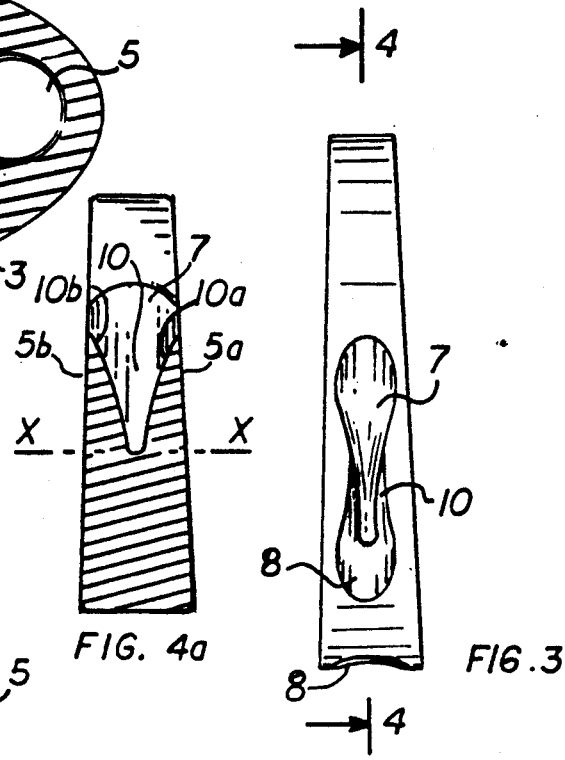
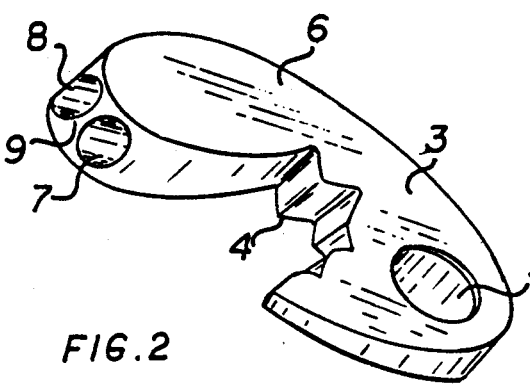
FIG. 2
FIG. 4a
FIG. 3
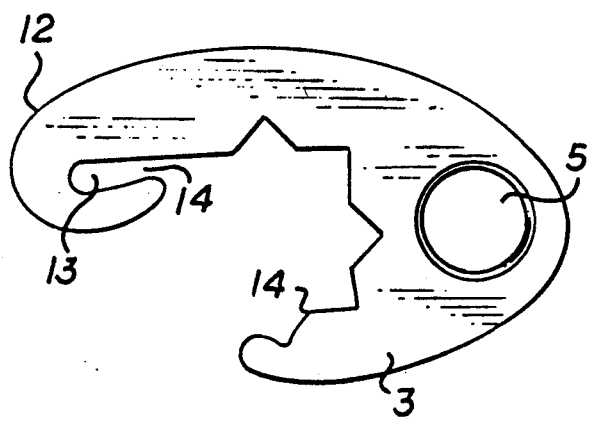
FIG. 5
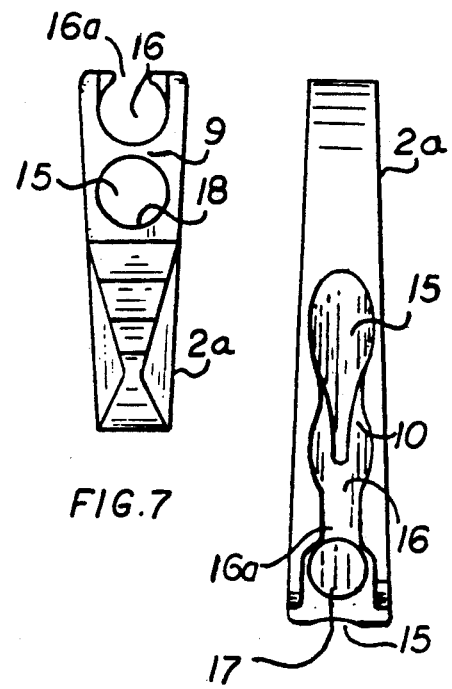
FIG. 7
FIG. 8
FIG. 6

CARGO TIE-DOWN DEVICE

PRIOR APPLICATION

This Application is a Continuation-in-part of copending application Ser. No. 07/512,353, filed Apr. 30, 1990, now abandoned.

BACKGROUND OF THE INVENTION

This invention relates to vehicle mounted cargo racks and more specifically to tie-down devices used in connection therewith.

When objects need to be secured to a cargo rack, it becomes necessary to pass a long length of cord back and forth across the load, feeding it around the rails of the rack, and securing the ends with a knot or some similar means. This cumbersome and time consuming process can be overcome by the use of a multitude of fabric-jacketed elastomeric cords or ropes with incorporated end hooks. The hooks currently in use offer little or no adjustability and are shaped in such a way as to attach to only a limited number of surfaces. In such a case it would be advantageous to have a system for securing cargo to a variety of surfaces, without the use of multiple or oversize lengths of cord.

SUMMARY OF THE INVENTION

The principal and secondary objects of this invention are to provide a simple tie-down system for quickly securing various types of loads to a cargo rack without having to utilize multiple or overly cumbersome lengths of cord. These and other objects are achieved by providing a length of fabric-jacketed elastomeric cord or rope, hooks that are easily adjustable and adaptable to polygonal, cylindrical, and irregular surfaces, and a third similar or same hook that is easily attachable to any point along the length of the cord.

BRIEF DESCRIPTION OF THE DRAWINGS

FIG. 2 is a rear, right side and bottom perspective view of the end hook;

FIG. 3 is a top plan view of said hook;

FIG. 4 is a sectional view taken along line 4—4 of FIG. 3;

FIG. 4a is a sectional view taken along axis Y—Y;

FIG. 5 is a side elevation of the intermediary hook;

FIG. 6 is a bottom plan view of the intermediary hook;

FIG. 7 is a rear elevational view of the alternate embodiment of the end hook; and FIG. 8 is a top plan view of the alternate embodiment of the end hook.

DESCRIPTION OF THE PREFERRED EMBODIMENT OF THE INVENTION

Figure 1:
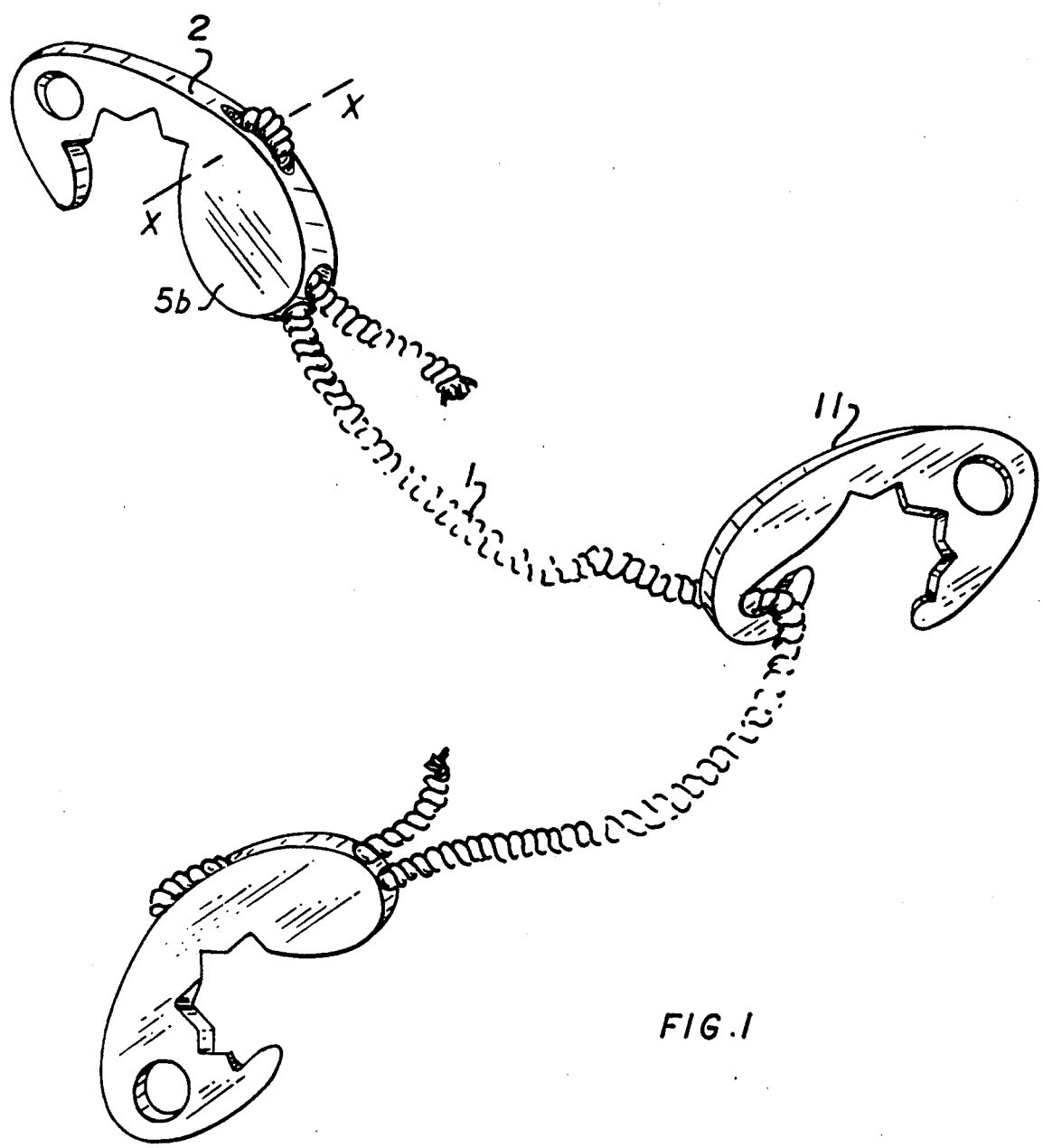
FIG. 1 is a perspective view of the preferred embodiment of the invention.

Referring now to the drawing, there is shown in FIG. 1, a cargo tie-down system. The system comprises a fabric-jacketed elastomeric cord 1, and two or more attachment hooks 2. The bails 3, of these hooks have an inside surface that is lined with teeth 4. These teeth have a peak angle of 135 degrees. Each tooth is successively offset from the adjacent one by an angle of 90 degrees. This offset of angles allows the hook to attach to polygonal, cylindrical or irregular surfaces. A transverse hole 5 is bored through the bail. This hole is of size and shape to accommodate an index finger to facilitate grasping and pulling of the hook. Each hook is carved out of a generally oval, flat slab of plastic or metal. Although it may also be manufactured by molding process.

The end hook 2, detailed in FIGS. 2, 3 and 4 has a shank 6, and two cylindrical channels 7, 8 bored through the thickness of the slab. The axes of these bores are parallel to each other and symmetrically equidistant from the lateral faces 5a, 5b of the hook. These bores are of a shape and size to allow the passage of the cord 1. One end of the cord is inserted through the bottom end of one of the channels, bent around the separating thin wall 9 of the channels, and passed back through the opposite channel, the outer walls 7a and 8a of the channels apply two opposing restraining forces against the cord, holding the cord in a generally reverse direction bend. The top end of the separating wall 9 between the two channels is notched in the shape of an arcuate wedge 10. This notch tapers down from the lateral edge of the slab toward a point defined by the intersection of the axis X—X of the bend in the cord and the median axis Y—Y of the separating wall 9 about the middle of that wall. As more specifically illustrated by FIG. 4a, the wall 10a and 10b of the notch 10 are slightly arcuate. When either end of the cord is pulled, the bent portion of the cord is drawn down onto the notch and progressively squeezed by the arcuate walls. The natural pinching action upon the cord between the walls 10a, 10b, prevents either end of the cord from being pulled through the channels. This process can be easily reversed, allowing the hook to be adjusted to shorten the cord working length.

FIGS. 5 and 6 refer to the intermediary hook 11. The shank 12, of this hook, forms a tapered slot 13. The mouth of the slot 14 is smaller than the diameter of the cord, so that when attached to the cord it creates a pinching action against the cord, protecting the hook from accidental disengagement. One or more of these universal intermediary hooks can be attached at any point along the cord, shaping the cord in a zig-zag fashion so as to cover a wider load area.

FIGS. 7 and 8 refer to an alternate embodiment of the end hook 2a. The second channel 16 has a slot 16a along the top edge of the hook. A hole 17 is bored through the separating wall the channels 15 and 16 perpendicular to the axes of the channels. After the cord is passed through the cylindrical channel, it is bent as in the first embodiment, and run through the channel 15 and the hole 16. The outer edge 17 of the hole 16, and the inner wall 18 of the channel 15 apply two opposing restraining forces to hold the cord in a reverse direction bend engaging the wedged notch 19 as in the first embodiment.

While the preferred embodiments of the invention have been described, modifications can be made thereto and other embodiments may be devised without departing from the spirit of the invention and the scope of the appended claims.

What is claimed is:

1. In combination with a cargo tie-down assembly, a hook which comprises:

a generally shallow, oval slab having substantially flat top and bottom surfaces, and comprising a bail and a shank respectively defined at opposite longitudinal ends of the slab by a lateral cut-out section;

said slab having first and second linear tubular passages bored through the shank, said passages having axes parallel to each other and to said top and bottom surfaces, and being separated by a thin partition; and said partition having a notch with lateral walls arcuately tapering down from a lateral edge of the slab toward the middle of the partition in a direction parallel to said axes whereby a rope inserted through said first passages is received around said notch and is then inserted through said second passages, and whereby said lateral walls of said notch are adapted to receive ropes of various diameters.

2. The combination of claim 1, wherein the bail of said hook defines a throat opening having an inboard surface, said inboard surface having a plurality of teeth.

3. The combination of claim 2, wherein said bail has a transverse bore hole, said hole is shaped and dimensioned to receive an index finger.

4. The combination of claim 3, wherein said partition has a hole connecting said first and second passages.

5. The combination of claim 3, wherein said cargo tie-down assembly further comprises a length of rope engaged at each end to one of said hooks and an auxiliary hook comprising:

a bail defining a bail open throat;

a shank connected to said bail having a means for transaxially engaging a length of rope;

said means for transaxially engaging comprising a second hook having a second hook throat opening which faces the opposite direction of the bail open throat.

6. The combination of claim 3, wherein said cargo tie-down assembly further comprises a length of rope engaged at each end to one of said hooks and an auxiliary hook comprising:

a bail defining an open throat;

a shank connected to said bail having a means for transaxially engaging a length of rope; and said means for transaxially engaging comprises a hole, bored transaxially through the shank.

7. The combination of claim 2, said teeth having angles of 135 degrees, a lateral wall of each tooth being successively offset from a lateral wall of an adjacent tooth by 90 degrees.

* * * * *